(12) United States Patent
Fowler-Hawkins

(10) Patent No.: US 8,196,628 B2
(45) Date of Patent: *Jun. 12, 2012

(54) TIRE AND WHEEL NOISE REDUCING DEVICE AND SYSTEM

(75) Inventor: Sanford Elliot Fowler-Hawkins, New York, NY (US)

(73) Assignee: Tire Acoustics, LLC, Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/779,576

(22) Filed: May 13, 2010

(65) Prior Publication Data

US 2010/0218870 A1 Sep. 2, 2010

Related U.S. Application Data

(63) Continuation of application No. 11/473,928, filed on Jun. 23, 2006, now Pat. No. 7,740,035.

(60) Provisional application No. 60/694,018, filed on Jun. 24, 2005.

(51) Int. Cl.
*B60C 5/00* (2006.01)
*B60C 19/00* (2006.01)
*B60B 21/12* (2006.01)
*F16F 15/00* (2006.01)

(52) U.S. Cl. ............... 152/381.6; 152/381.5; 152/339.1

(58) Field of Classification Search .................. 152/152, 152/381.5, 381.6, 400, 331.1, 339.1, 340.1; 181/196, 256, 257, 258

See application file for complete search history.

(56) References Cited

U.S. PATENT DOCUMENTS

| 466,548 A | | 1/1892 | Woodward | |
|---|---|---|---|---|
| 2,493,731 A | * | 1/1950 | Watter | 152/333.1 |
| 2,502,016 A | | 3/1950 | Olson | |
| 2,502,020 A | | 3/1950 | Olson | |
| 2,901,290 A | | 4/1959 | Loofbourrow | |
| 3,921,689 A | | 11/1975 | Caccia et al. | |
| 4,392,522 A | * | 7/1983 | Bschorr | 152/341.1 |
| 4,399,851 A | | 8/1983 | Bschorr | |

(Continued)

FOREIGN PATENT DOCUMENTS

DE 2126289 12/1972

(Continued)

OTHER PUBLICATIONS

European Search Report dated Jun. 24, 2011 for European Patent Application No. 09726497.2.

(Continued)

*Primary Examiner* — Kip T Kotter
(74) *Attorney, Agent, or Firm* — Johnson, Marcou & Isaacs, LLC

(57) ABSTRACT

A system for dissipating sound shock waves within a vehicle tire includes a wheel upon which a tire is mounted to create an internal air chamber defined by the wheel and the tire. A flow-resistant barrier is coupled to the wheel or the tire and defines an air cavity within the internal air chamber. The barrier comprises a material that provides an acoustical resistance to sound shock waves passing therethrough. The air cavity defined by the barrier has a volume such that air within the cavity offers relatively small impedance to the passage of shock waves through the barrier and into the air cavity. The barrier also can produce frictional heat when displaced by a shock wave, thereby converting energy of the shock wave to heat to reduce noise associated therewith.

20 Claims, 11 Drawing Sheets

U.S. PATENT DOCUMENTS

| | | |
|---|---|---|
| 4,570,748 A | 2/1986 | Ghibu et al. |
| 4,755,006 A | 7/1988 | Clay et al. |
| 4,909,295 A | 3/1990 | Nirei et al. |
| 5,109,905 A | 5/1992 | Lambe |
| 5,479,974 A | 1/1996 | Noggle et al. |
| 5,681,072 A | 10/1997 | Stricker |
| 5,891,278 A | 4/1999 | Rivin |
| 5,894,874 A | 4/1999 | Yamagiwa et al. |
| 6,106,075 A | 8/2000 | Suenaga |
| 6,186,203 B1 | 2/2001 | Fone |
| 6,244,314 B1 | 6/2001 | Dodt et al. |
| 6,343,843 B1 | 2/2002 | Nishikawa |
| 6,390,563 B1 | 5/2002 | Haverkamp et al. |
| 6,422,655 B1 | 7/2002 | Britton et al. |
| 6,450,225 B2 | 9/2002 | Yukawa et al. |
| 6,516,849 B2 * | 2/2003 | Flament et al. ............... 152/400 |
| 6,533,009 B2 | 3/2003 | Aoki |
| 6,648,421 B1 | 11/2003 | Akiyoshi et al. |
| 6,715,842 B1 | 4/2004 | Bopp et al. |
| 6,726,289 B2 | 4/2004 | Yukawa et al. |
| 6,755,483 B2 | 6/2004 | Yukawa et al. |
| 6,880,597 B2 | 4/2005 | Yukawa et al. |
| 7,131,477 B2 | 11/2006 | Smith |
| 7,290,577 B2 * | 11/2007 | Rumbaugh ............... 152/153 |
| 7,360,570 B2 | 4/2008 | Ishida |
| 7,387,141 B2 | 6/2008 | Tanno et al. |
| 7,434,660 B2 | 10/2008 | Yamagiwa et al. |
| 7,475,713 B2 | 1/2009 | Naito et al. |
| 7,740,035 B2 | 6/2010 | Fowler-Hawkins |
| 7,992,605 B2 | 8/2011 | Yee |
| 2001/0015249 A1 | 8/2001 | Mohr |
| 2003/0041942 A1 | 3/2003 | Yukawa et al. |
| 2003/0188817 A1 | 10/2003 | Yukawa et al. |
| 2004/0066083 A1 | 4/2004 | Tsihlas |
| 2005/0161138 A1 | 7/2005 | Yakawa et al. |
| 2006/0124216 A1 | 6/2006 | Naito et al. |
| 2006/0289100 A1 | 12/2006 | Fowler-Hawkins |
| 2008/0128201 A1 | 6/2008 | Yamaguchi et al. |
| 2011/0083778 A1 | 4/2011 | Fowler-Hawkins |

FOREIGN PATENT DOCUMENTS

| | | |
|---|---|---|
| DE | 2442917 | 3/1976 |
| DE | 4317268 A1 | 12/1994 |
| DE | 20 2004 008030 U1 | 9/2004 |
| DE | 20 2008 009008 U1 | 9/2008 |
| EP | 1741570 A1 | 1/2007 |
| EP | 1852279 A1 | 11/2007 |
| FR | 1096438 A | 6/1955 |
| JP | 401115704 | 5/1989 |
| JP | 4-159101 A | 6/1992 |
| JP | 2003-285607 A | 10/2003 |
| JP | 2004-082947 A | 3/2004 |
| JP | 2004-276809 A | 10/2004 |
| JP | 2005-205937 A | 8/2005 |
| JP | 2006-306285 A | 11/2006 |

OTHER PUBLICATIONS

Office Action dated Dec. 1, 2011 for U.S. Appl. No. 12/894,857.

* cited by examiner

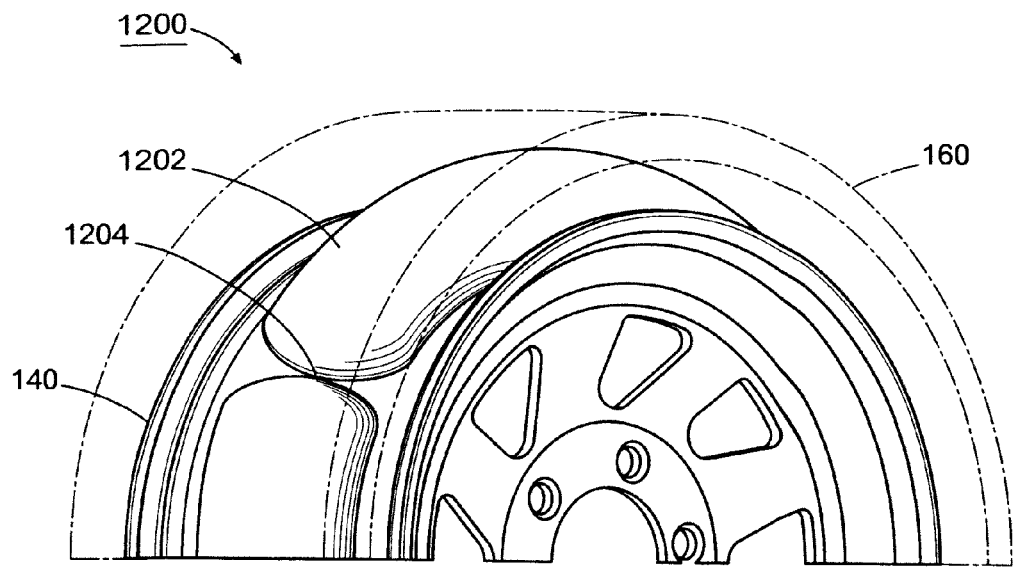
FIG. 12
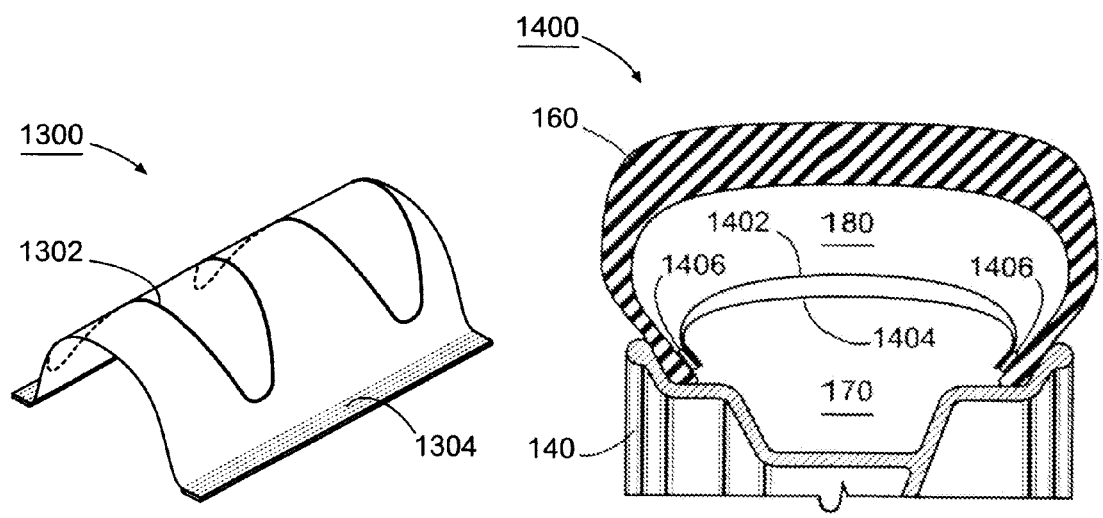
FIG. 13   FIG. 14

TIRE AND WHEEL NOISE REDUCING DEVICE AND SYSTEM

CROSS-REFERENCE TO RELATED APPLICATIONS

This patent application is a continuation of U.S. patent application Ser. No. 11/473,928 filed Jun. 23, 2006 (now U.S. Pat. No. 7,740,035), which claims priority under 35 U.S.C. §119 to U.S. Provisional Patent Application No. 60/694,018, entitled "Tire and Wheel Noise Absorbing Device and System," filed Jun. 24, 2005. The complete disclosure of the above identified priority applications is hereby fully incorporated herein by reference.

TECHNICAL FIELD

The present invention relates generally to reducing vehicle noise from tires and wheels. Specifically, the present invention relates to a sound-reducing device disposed in the internal air chamber created by a tire and a wheel upon which the tire is mounted.

BACKGROUND OF THE INVENTION

When car tires contact a road surface, they generate considerable noise. At speeds above 25 mph in certain vehicles, tire noise can be greater than all other sources of automotive noise combined. Accordingly, car and tire manufacturers spend large amounts of resources every year on research and development to reduce tire noise.

Tire noise results from many sources. For example, tire noise results from (1) low-frequency shock waves produced by excitation of the internal tire air chamber from tire deformation caused by the contact of the tire with the road surface; (2) low-frequency tire structure ringing due to air chamber excitation caused by the deflection of the tire at road contact; (3) high-frequency external tread air compression caused by air temporarily trapped between the tread and the road surface; and (4) high-frequency contact scrub caused by the friction between the tire and the road surface.

Some tread air compression noise is not avoidable. For example, tread air compression acts to clear water from the tread contact surface by compressing the water and air at road contact and then expanding the mixture at tread release. Additionally, some contact scrub noise is not avoidable because tires have finite adhesion which generates friction and noise with the road surface.

Shock wave energy from tire deformation is transmitted from the tread contact area into the internal tire air chamber created by the tire and the wheel upon which the tire is mounted. The energy transmitted into the internal tire air chamber is only dissipated by tire ringing and coupling of the noise to the wheel. Such tire ringing and noise coupling comprise a large portion of the total amount of tire noise.

Conventional methods for reducing tire noise have several deficiencies. In particular, those methods do not effectively absorb low-frequency energy (e.g., below 800 Hz) associated with the shock waves that produce tire noise. As tires generate significant low-frequency energy, an efficient tire noise absorber should reduce the noise produced by such low-frequency energy. However, conventional methods do not adequately reduce that noise. Additionally, low-frequency noise increases perceived high frequency noise produced by tread air compression and tire scrub. Accordingly, conventional methods fail to reduce the perceived high frequency tire noise by failing to reduce low-frequency energy noise. Other deficiencies include the difficulty of mounting a tire to a wheel when using a conventional method, the possible damage if the conventional method fails during vehicle operation, and the inefficiency of conventional methods.

Conventional low-frequency noise absorbing methods exist. However, such conventional methods are not practical for small internal air chambers, such as a tire's air chamber. Such conventional low-frequency absorbing methods are too large for a tire air chamber, would prevent tire inflation, are not efficient, and/or pose safety hazards if used in combination with a tire.

Accordingly, a need exists in the art for reducing noise generated by or within tires and the wheels upon which the tires are mounted. Particularly, a need exists in the art for reducing tire noise by absorbing or reducing energy in the internal air chamber of a tire. More particularly, a need exists for a tire noise absorber/reducer that can absorb or reduce low frequency energy while operating inside a small internal air chamber, such as a tire's air chamber.

SUMMARY OF THE INVENTION

A device for reducing tire noise can absorb and reduce low-frequency energy that produces tire noise. The device can absorb sound shock waves by alternately pressurizing and depressurizing a vessel having an air flow-resistant barrier. The flow-resistant barrier dampens pressure flows into and out of the vessel to dampen shock waves that pass through the barrier. Additionally, friction in the flow-resistant element of the vessel converts sound energy into heat, thus attenuating the sound. Additionally, a hybrid device can have elements of an air flow-resistant cavity absorber and elements of a frictional absorber.

According to one aspect, a tire noise absorbing device can comprise multiple layers of an air flow-resistant material with multiple openings in each layer. The layers can be assembled such that the openings of each layer are offset with respect to overlapped portions of an adjacent layer. The offset openings allow air to pass through the layers when the tire is stationary and the layers are slack, thereby allowing complete inflation of the tire. The overlapping layers can be coupled to a wheel or directly to a tire to form loops of overlapped elements. When a car is put into motion and the tire begins to rotate, centrifugal force forces the overlapped layers outward and together to seal the air passages of the openings and to form an air flow-resistant cavity between the wheel and the cloth layers. Specifically, the inner layer is forced outward against the outer layer, the openings in the inner layer are sealed by the outer layer, and the openings in the outer layer are sealed by the inner layer. The layers restrict air flow between a tire (outer) side of the layers and a wheel (inner) side of the layers, thereby absorbing low-frequency energy noise as air passes through the layers.

In a further embodiment, the layers can slide against each other and create friction when displaced by low-frequency shock waves. The resulting friction can absorb additional low-frequency energy noise by dissipating such the shock waves via heat produced by the friction.

Increasing the absorption of low-frequency energy also can reduce the perceived high-frequency tire noise without compromising tread design or tire adhesion. The design can fit easily into an existing tire and can be mounted to existing wheels or to a tire during or after the manufacturing process.

Other aspects include variations of the position and coupling means of attaching the device to the wheel or tire. For example, the device can be coupled at a centrally located position on the wheel or with various profiles that provide different shaped flow-resistant cavities. Still other aspects include multiple elements with overlapping or interlocking ends to create the flow-resistant cavity. These elements are forced outward by centrifugal force and create a cavity when the overlapping or interlocking portions move together to create a device that resists air flow. In addition, the overlapping portions can create friction when displaced by shock waves to further absorb low frequency noise. Yet another aspect includes creating multiple flow-resistant air cavities by layering two or more flow-resistant elements around a wheel or tire. These multiple flow-resistant air cavities can absorb shock waves and can improve noise reduction. Further aspects involve a tubular, crescent, or curved element positioned on the wheel or tire, thus creating a single flow-resistant cavity. Such an element in the tubular shape also can be used in sections to create multiple flow-resistant cavities around the wheel.

The described devices can be coupled to the wheel or tire in a variety of ways. For example, the elements that create the flow-resistant cavity can be coupled to the wheel or tire with adhesive or clamps, by being crimped into a groove or flange in the wheel or tire, or by being welded, molded, or weaved into the wheel or tire.

BRIEF DESCRIPTION OF THE DRAWINGS

FIG. 12 is a perspective view illustrating a tire noise absorbing system comprising multiple tubular air flow-resistant barriers according to an exemplary embodiment.

FIG. 13 is a perspective view illustrating a representative element that can be used in any embodiment illustrated in FIGS. 1-12 and 14 according to an exemplary embodiment.

FIG. 14 is a cross-sectional view of a tire noise absorbing system comprising a flow-resistant barrier coupled to a tire mounted to a wheel according to an exemplary embodiment.

DETAILED DESCRIPTION OF EXEMPLARY EMBODIMENTS

Figure 1A:
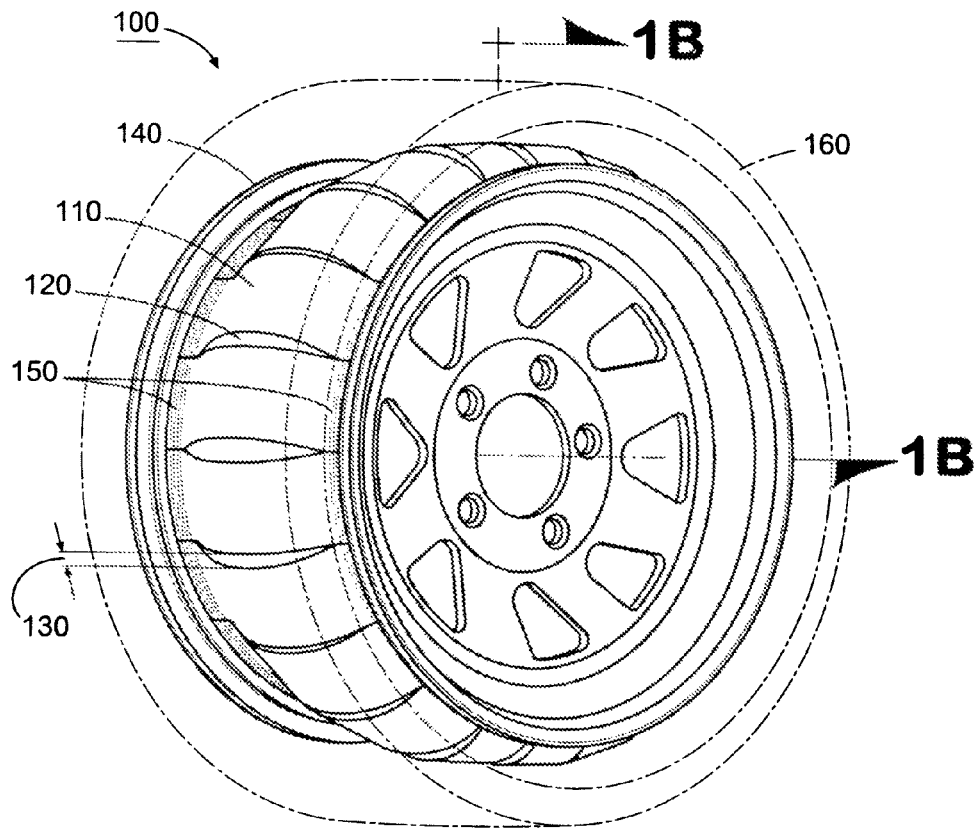
FIG. 1A is a perspective view illustrating a tire noise absorbing system comprising a flow-resistant barrier disposed on a wheel for a tire according to an exemplary embodiment.

Exemplary embodiments will be described with reference to FIGS. 1-13 in which the same reference numerals represent similar elements.

Figure 1B:
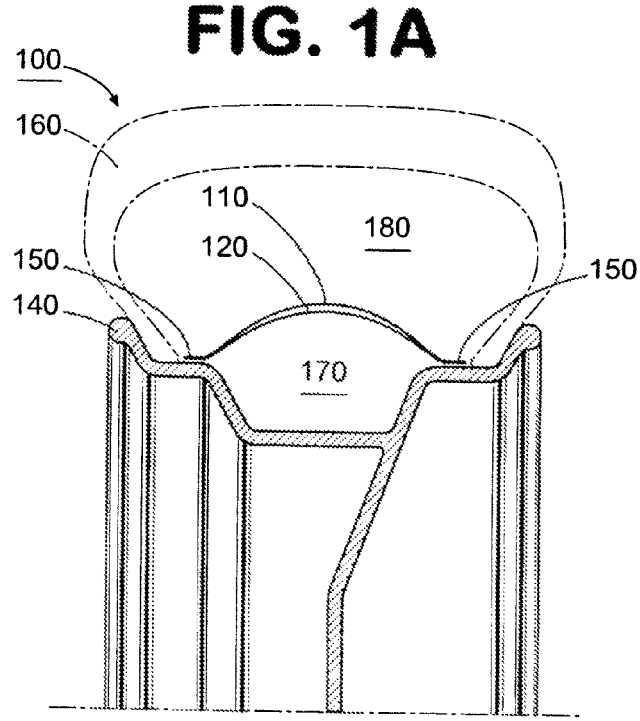
FIG. 1B is a cross-sectional view of the exemplary system illustrated in FIG. 1A.

FIG. 1A is a perspective view illustrating a tire noise absorbing system 100 comprising a flow-resistant barrier disposed on a wheel 140 for a tire 160 according to an exemplary embodiment. FIG. 1B is a cross-sectional view of the exemplary system 100 illustrated in FIG. 1A. As shown in FIGS. 1A and 1B, the system 100 comprises multiple, overlapped layers 110, 120 of material, which form an acoustic flow-resistant barrier. The layer 110 comprises an outer layer with reference to the wheel 140, and the layer 120 comprises an inner layer with reference to the wheel 140. The overlapping layers 110, 120 are coupled to the wheel 140 along their edges at location 150 to form loops of overlapped material. In other words, the layers 110, 120 are wrapped around the wheel 140 and coupled to both sides of the wheel 140 at locations 150. The location 150 indicates any suitable location on the wheel 140 for coupling the flow-resistant barrier thereto. Alternatively, the layers 110, 120 can be coupled directly to a tire 160 in a similar fashion such that they form loops of overlapped absorptive elements for a flow-resistant barrier (see FIG. 14 discussed hereinafter).

In the exemplary embodiment illustrated in FIGS. 1A and 1B, both edges of the layers 110, 120 are attached to opposite sides of the wheel 140 with enough slack to allow centrifugal force to force the layers 110, 120 outward to create the flow-resistant barrier defined by the layers 110, 120. The flow-resistant barrier defines an inner air cavity 170 in an internal tire air chamber defined by the tire 160 and the wheel 140. Thus, the flow-resistant barrier divides the internal tire air chamber into an inner air cavity 170 and an outer air cavity 180. The barrier defined by the layers 110, 120 is flow-resistant because the layers 110, 120 resist air flow between the outer air cavity 180 and the inner air cavity 170. In an exemplary embodiment, the volume of the inner air cavity can have a volume that is in a range of about 8% to about 40% of the total internal tire air chamber volume. Other cavity volumes are suitable. The volume of the inner air cavity 170 can be sized so that the air therein provides little resistance to the flow of sound shock waves from the outer air cavity 180 through the layers 110, 120 to the inner air cavity 170.

Thus, the barrier comprises a material that provides an acoustical resistance to sound shock waves passing therethrough. The inner air cavity 170 defined by the barrier has a volume such that air within the inner air cavity 170 offers relatively small impedance to the passage of shock waves through the barrier and into the inner air cavity 170. In operation, sound shock waves are produced in the outer air cavity 170 as the tire travels over a road. The sound shock waves travel toward the inner air cavity 170 and encounter the flow-resistant barrier defined by the layers 110, 120. As the sound shock waves pass through the barrier, the barrier absorbs energy from those shock waves due to the acoustical impedance of the barrier. Initially, the air within the inner air cavity 170 offers relatively small impedance to the passage of shock waves through the barrier and into the inner air cavity 170. As shock waves continue to pass through the barrier and into the inner air cavity 170, the inner air cavity 170 becomes pressurized with respect to the outer air cavity. At this point, the air in the inner air cavity 170 can impede the passage of shock waves through the barrier and into the inner air cavity 170. When the inner air cavity pressure becomes greater than the outer air cavity pressure, the inner air cavity 170 will depressurize as air flows out of the inner air cavity 170 to the outer air cavity 180. That process continues while the tire is in motion. Additionally, sound shock waves that pass through the flow-resistant barrier and are reflected by the wheel 140 will pass back through the flow-resistant barrier to the outer air cavity 180. The flow-resistant barrier will absorb further energy from the sound shock waves during that process, further reducing noise associated therewith. The barrier also can reduce noise associated with the sound shock waves by converting energy from those shock waves into frictional heat, as discussed in more detail hereinafter.

The layers 110, 120 restrict but not prevent air flow between the outer air cavity 180 and the inner air cavity 170. Accordingly, the layers 110, 120 provide acoustical impedance by resisting the flow of sound shock waves therethrough. In exemplary embodiments, the layers 110, 120, can comprise flexible cloth. For example, the layers 110, 120 can comprise Kevlar, cotton, Spectra, silk, fiberglass, or any other suitable material. Such suitable materials generally include a weave or structure that restricts air flow through the material based on the space tightness of the weave or structure of the material.

In an exemplary embodiment, the layers 110, 120 can comprise a material having a weave with a porosity ranging from about 10% to about 50% cavity fill at cavity saturation, based on the resonant energy in a closed tire cavity. "Cavity fill at cavity saturation" describes the length of time required to pressurize the inner air cavity 170 by sound shock waves passing through the flow-resistant barrier formed by the layers 110, 120. The time it takes to fill or empty the inner air cavity 170 determines the limit of low frequency absorption of the system 100. Other porosities are suitable. For example, an alternative suitable porosity to pressurize the inner air cavity 170 is from about 10% to about 75% at low frequencies. The lower frequency performance of a flow-resistant absorber depends on the size of the inner air cavity 170 and the efficiency of the resistance of the flow-resistant barrier created by the layers 110, 120. Flow resistance depends on the porosity of the material of the layers 110, 120. As the cavity fills with air from the sound shock waves passing through the flow-resistant barrier, the pressure resistant cavity absorber can reach a lower frequency limit based. The low frequency limit is established based on the time it takes for the inner air cavity 170 to fill or empty. The larger the inner air cavity 170, the lower the frequency limit. In an exemplary embodiment, the acoustical resistance of the flow-resistant barrier and the size of the inner air cavity 170 will allow acoustical sound waves to pass through the barrier quickly enough to reduce the noise associated therewith, but slowly enough to allow the inner air cavity 170 to become fully pressurized. The inner air cavity 170 is fully pressurized when it has reached the same pressure as the pressure caused by the acoustical sound waves. As the energy absorber of the system 100 is disposed within a pressurized air chamber (i.e., the internal tire air chamber), the system 100 can comprise a smaller air cavity than would be needed at normal atmospheric pressure.

In the exemplary embodiment illustrated in FIGS. 1A and 1B, the apertures 130 comprise slits formed in the layers 110, 120. The apertures 130 in each layer 110, 120 are offset such that the openings in adjacent layers 110, 120 do not overlap. When the wheel 140 is stationary, the layers 110, 120 are slack. In that state, the apertures 130 allow air to pass therethrough, thereby allowing complete inflation of the internal tire air chamber. Complete inflation means inflation of the outer air cavity 180 between the tire and the layers 110, 120 and the inner air cavity 170 between the layers 110, 120 and the wheel 140. The apertures 130 can comprise any suitable geometry that allows the layers 110, 120 to conform to the wheel 140 and that allows air to pass between the layers 110, 120 for tire inflation.

In an exemplary embodiment, the layers 110, 120 can be coupled directly to the wheel 140 at location 150 using an adhesive. For example, the adhesive can comprise epoxy or other any other suitable adhesive for attaching the layers 110, 120 to the wheel 140. The adhesive can be selected based on the particular application to adhere the layers 110, 120 to the wheel 140 and to resist the centrifugal force generated by the rotation of the wheel 140 and heat generated within the internal tire air chamber.

In alternative exemplary embodiments, other suitable methods can be used to couple the layers 110, 120 to the wheel 140. For example, the layers 110, 120 can be crimped into a groove (not shown) or flange (not shown) attached to or molded in the wheel 140. Alternatively, the layers 110, 120 can comprise a metal flange (not shown) along the edge of the layers 110, 120, and the flange can be welded around or otherwise coupled to the wheel 140.

As depicted in FIGS. 1A and 1B, the system 100 can comprise two layers 110, 120. However, additional layers can be used in alternative exemplary embodiments. For example, the system 100 can comprise three or more layers. The layers can be assembled such that the apertures 130 between adjacent layers are offset and do not overlap.

Figure 2:
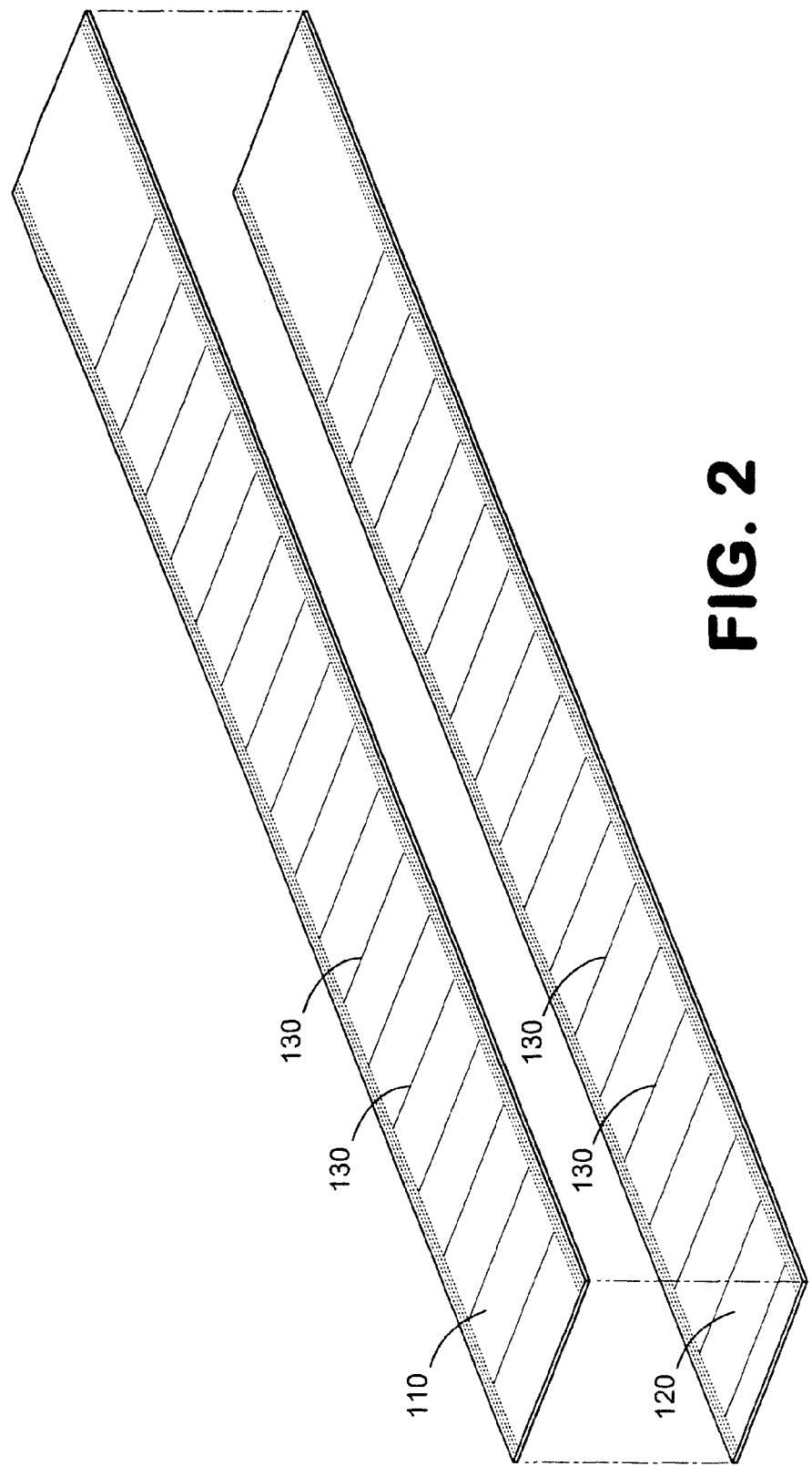
FIG. 2 illustrates features of the layers of the tire noise absorbing system illustrated in FIGS. 1A and 1B according to an exemplary embodiment.

FIG. 2 illustrates features of the layers 110, 120 of the tire noise absorbing system 100 illustrated in FIGS. 1A and 1B according to an exemplary embodiment. As shown, the layers 110, 120 of the system 100 comprise continuous layers of flat material with multiple apertures 130 in each layer. In an exemplary embodiment, the openings can be spaced in a range of about 1 to about 5 inches apart. Other spacing between the openings is suitable. The continuous layers can be wrapped around and attached to the wheel 140 as illustrated in FIGS. 1A and 1B.

In an alternative exemplary embodiment (not illustrated in FIGS. 1A, 1B, 2, and 14), each layer 110, 120 can comprise multiple strips of material disposed adjacent to each other and overlapped to form the apertures 130. In this exemplary embodiment, the strips can have a width in the range of about 1 to about 5 inches. Other widths of the strips are suitable. In this embodiment, the strips of material can be assembled into two rings and wrapped around and attached to the wheel 140. Alternatively, the strips of material can be individually attached to the wheel 140 in the desired configuration.

In an alternative exemplary embodiment (not illustrated in FIGS. 1A, 1B, 2, and 14), the individual strips of material can be tapered on one or both edges. Tapering the strips of material at the point of attachment to the wheel 140 can allow for more complete overlap of the strips. Tapering the strips of material also can allow the strips to be attached to two different wheel diameters, which can allow matching the strips to the different diameters of different wheels 140. Additionally, tapering the edges of the strips can allow forming the shape of the cavity to other suitable shapes. In an exemplary embodiment, the shape of the cavity can comprise a truncated cone.

A length of the layers 110, 120 equals the circumference of the wheel 140 along the location 150. In an alternative exemplary embodiment, the length of the layers 110, 120 can be greater than the circumference of the wheel 140 for overlapping ends of the layers 110, 120 when coupling the layers 110, 120 to the wheel 140.

As shown in FIG. 1A, the layers 110, 120, are collapsed (or slack) close to the wheel 140 when the wheel 140 is stationary. Tire rotation inflates/erects the layers 110, 120 by pulling the layers 110, 120 outward from the center of the wheel 140. When a car on which the wheel 140 is mounted is put into motion and the wheel 140 begins to rotate, centrifugal force forces the layers 110, 120 outward and forces the inner layer 120 together with the outer layer 110 to create the flow-resistant barrier. The layers 110, 120 are forced together such that the apertures 130 in the inner layer 120 are sealed by the outer layer 110 and such that the apertures 130 in the outer layer 110 are sealed by the inner layer 120. Accordingly, the system 100 forms two air cavities 170, 180 in an internal air chamber of a tire mounted on the wheel 140, the internal air chamber being defined by the tire 160 and the wheel 140. The outer air cavity 180 is formed on a tire (outer) side of the layers 110, 120, and the inner air cavity 170 is formed on a wheel 140 (inner) side of the layers 110, 120.

In an alternative exemplary embodiment, if the tire noise reducing device does not cover the air inlet (not shown) in the wheel, then the apertures 130 in the layers 110, 120 in the system 100 can be omitted. In this case, two continuous layers can form a two layer torus.

Alternatively, a single, continuous layer of flow-resistant material without apertures 130 (i.e., without slits) can form a flow-resistant structure that creates the inner and outer air cavities 170, 180. The internal air chamber of a tire can fully inflate without the apertures 130 because the weave of the material does not entirely prevent air flow. In other words, the porosity of the material can allow for both tire inflation when the wheel is stationary, and sufficient flow-resistant properties for the barrier to erect under centrifugal force when the wheel is in motion. A similar continuous structure that is formed in a curved shape is described hereinafter with reference to FIG. 11.

The layers 110, 120 restrict air flow between the two cavities 170, 180 in the tire's internal air chamber. The "pores" (openings between the weave of the material) restrict but do not prevent such air flow. Thus, sound shock waves transmitted from the outer cavity 180 to the inner cavity 170 and vice versa must pass through the layers 110, 120. By resisting the air flow, the layers 110, 120 absorb the energy of the shock waves as the shock waves pass therethrough, thereby reducing noise, in particular, reducing low-frequency noise in the range of about 15 Hz to about 800 Hz and throughout the range of about 15 Hz to about 20 kHz.

In another exemplary embodiment, the layers 110, 120 can slide across each other and create friction when displaced by shock waves. This resulting friction reduces the low-frequency energy of the shock waves by turning the shock waves' energy into heat, thereby further reducing low-frequency noise associated with the low-frequency energy. For example, the two layers 110, 120 are held in place by centrifugal force. When the layers 110, 120 are displaced due to the concussion of sound energy, the geometry of the elements induces a movement between the layers 110, 120. Such movement causes friction between the layers 110, 120. Converting the sound shock wave into heat reduces the sound energy. If the layers 110, 120 have one side that is rougher than the other side, then the two rough sides can be disposed adjacent to each other to increase the friction between the layers 110, 120. The increased friction can increase the frictional diaphragm effect to more efficiently convert the sound energy into heat.

Additionally, a single-layer, continuous flow-resistant barrier can reduce noise via friction based on the movement of fibers within the weave of the material. The concussion f the sound energy moves the fibers with respect to each other, thereby causing friction within the barrier and converting sound energy into heat to reduce the sound energy.

In an exemplary embodiment, the outer layer 110 can comprise 3 inch wide portions between the apertures 130, and the inner layer 120 can comprise 4 inch wide portions between its apertures 130. The additional width on one of the layers can increase a seal between the layers 110, 120 to form the flow-resistant barrier when rotated.

In another alternative exemplary embodiment illustrated in FIG. 14, the layers 110, 120 can be coupled to the tire 160 which is then mounted on the wheel 140. FIG. 14 is a cross-sectional view of a tire noise absorbing system 1400 comprising a flow-resistant barrier coupled to the tire 160 mounted to the wheel 140 according to an exemplary embodiment. As shown, the flow-resistant barrier comprises two layers 1402, 1404 coupled to the tire 160 at locations 1406, which is mounted on the wheel 140. The layers 1402, 1404 can comprise materials similar to the materials of the layers 110, 120 described previously with reference to FIGS. 1A, 1B, and 2. Accordingly, those materials can have similar flow-resistant properties to create a flow-resistant barrier and a frictional noise attenuator. Additionally, the layers 1402, 1404 can comprise a structure similar to the layers 110, 120 described previously with reference to FIGS. 1A, 1B, and 2. Thus, the layers 1402, 1404 have apertures therein, similar to the apertures 130 in the layers 110, 120 described previously with reference to FIGS. 1A, 1B, and 2. The outer layer 1402 is offset from the inner layer 1404 such that the openings 130 of the outer and inner layers 1402, 1404 do not overlap.

The layers 1402, 1404 can be coupled to the tire 160 in any suitable manner. For example, the layers 1402, 1404 can be adhered to or molded into the bead or sidewalls of the tire 160. For instance, these alternative exemplary embodiments include the following: weaving the edges of the layers 1402, 1404 into the tire 160, molding the layers 1402, 1404 into the tire 160, inserting the layers 1402, 1404 into a groove in the tire casing, adhering the layers 1402, 1404 into or onto the tire 160, or any other suitable method for coupling the layers 1402, 1404 to the tire 160.

Figure 3A:
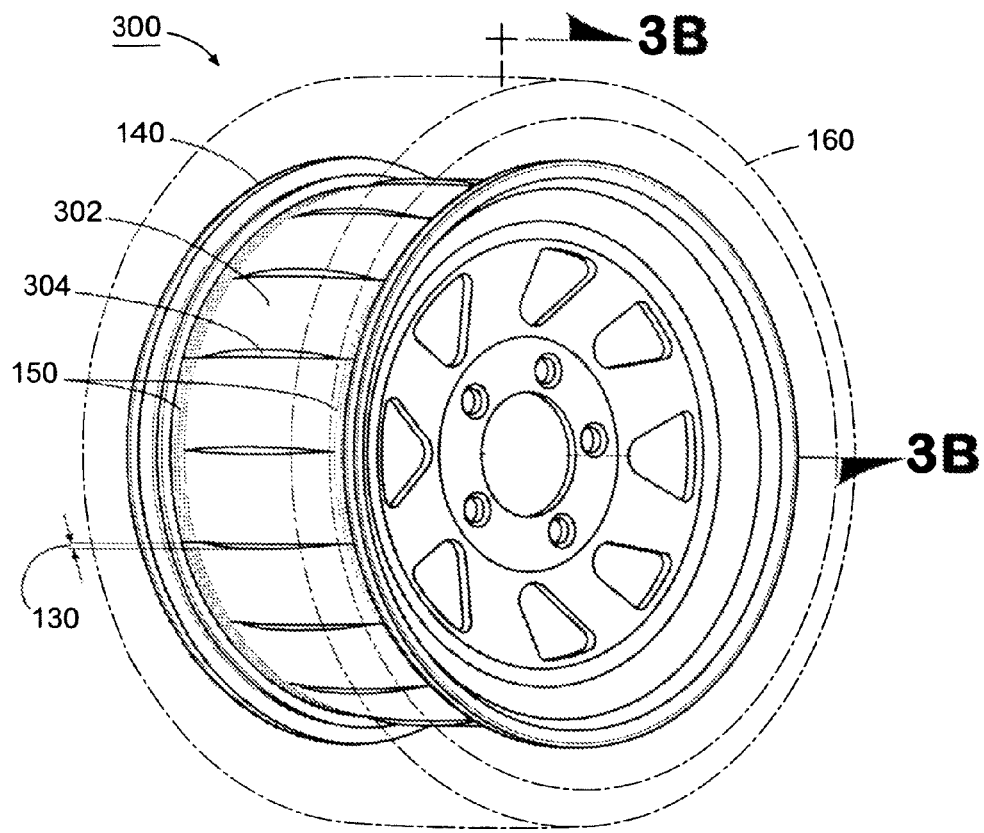
FIG. 3A is a perspective view illustrating a tire noise absorbing system comprising a flow-resistant barrier disposed on a wheel for a tire according to another exemplary embodiment.
Figure 3B:
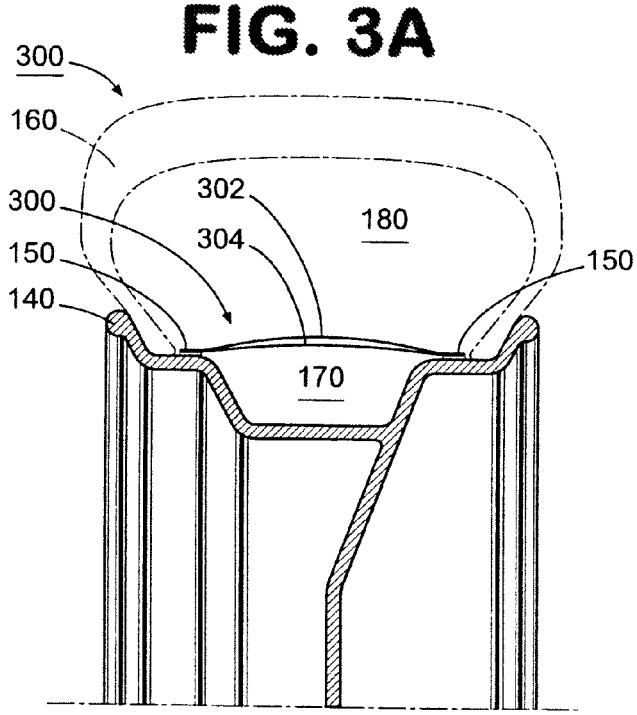
FIG. 3B a cross-sectional view of the exemplary system illustrated in FIG. 3A.

FIG. 3A is a perspective view illustrating a tire noise absorbing system 300 comprising a flow-resistant barrier disposed on the wheel 140 according to another exemplary embodiment. FIG. 3B a cross-sectional view of the exemplary system 300 illustrated in FIG. 3A. As shown in FIGS. 3A and 3B, the system 300 comprises two layers 302, 304 of material attached to the wheel 140 to create an air flow-resistant barrier. The layers 302, 304 can comprise materials similar to the materials of the layers 110, 120 described previously with reference to FIGS. 1A, 1B, 2, and 14 and can be similarly coupled to wheel 140 or tire 160. Accordingly, those materials can have similar flow-resistant properties to create a flow-resistant barrier and a frictional noise attenuator. Additionally, the layers 302, 304 can comprise a structure similar to the layers 110, 120 described previously with reference to FIGS. 1A, 1B, 2, and 14. Thus, the layers 302, 304 have apertures 130 formed therein. The outer layer 302 is offset from the inner layer 304 such that the openings of the outer and inner layers 302, 304 do not overlap. As illustrated, the system 300 comprises a lower profile than the system 100 illustrated in FIGS. 1A and 1B. The main difference between the systems 100 and 300 is that layers 302, 304 create a flow-resistant barrier having a lower profile than the flow-resistant barrier created by the layers 110, 120. The size of the layers 302, 304 can be adjusted to create the desired profile. A lower profile can make it easier to mount the tire 160 over the layers 302, 304 on the wheel 140.

Figure 4A:
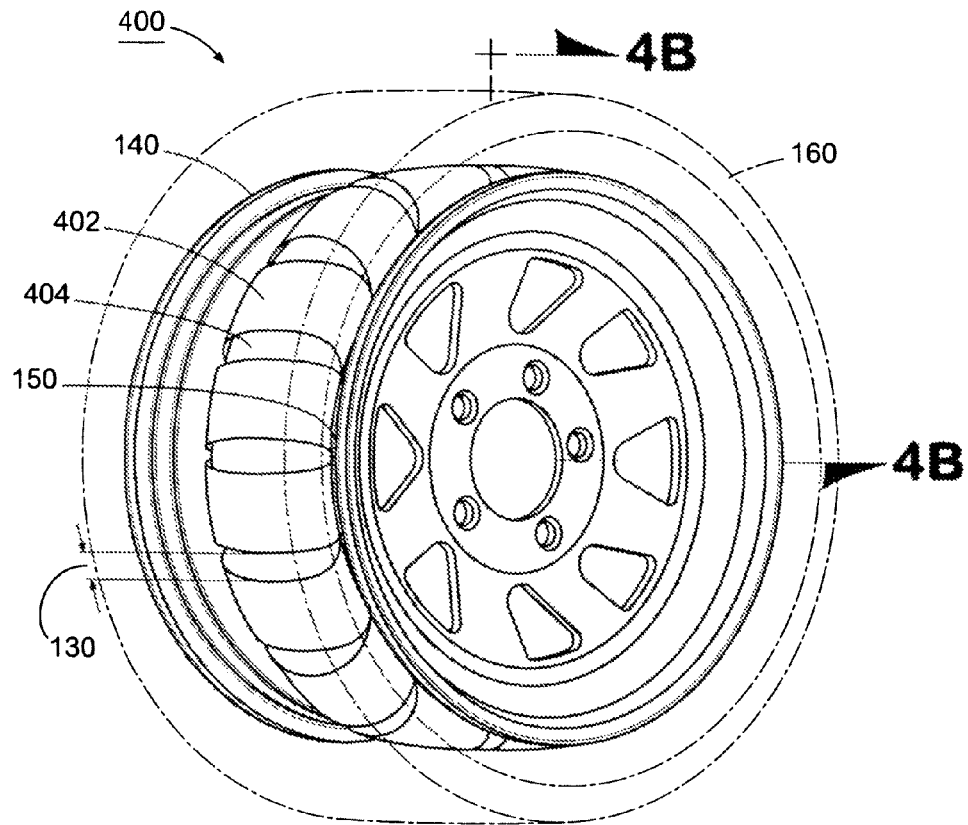
FIG. 4A is a perspective view illustrating a tire noise absorbing system comprising a flow-resistant barrier disposed on a wheel for a tire according to yet another exemplary embodiment.
Figure 4B:
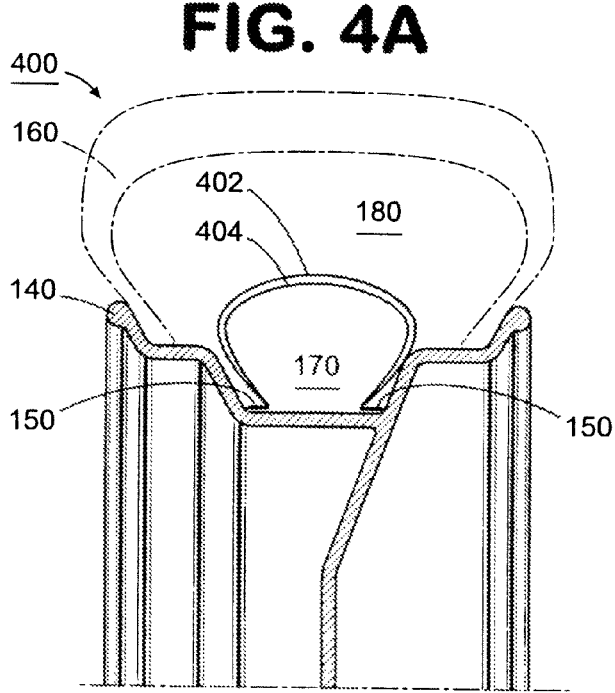
FIG. 4B is a cross-sectional view of the exemplary system illustrated in FIG. 4A.

FIG. 4A is a perspective view illustrating a tire noise absorbing system 400 comprising a flow-resistant barrier disposed on the wheel 140 according to yet another exemplary embodiment. FIG. 4B is a cross-sectional view of the exemplary system 400 illustrated in FIG. 4A. As shown in FIGS. 4A and 4B, the system 400 comprises two layers 402, 404 of material attached to the wheel 140 to create an air flow-resistant barrier. The layers 402, 404 can comprise materials similar to the materials of the layers 110, 120 described previously with reference to FIGS. 1A, 1B, 2, and 14 and can be similarly coupled to the wheel 140 or tire 160. Accordingly, those materials can have similar flow-resistant properties to create a flow-resistant barrier and a frictional noise attenuator. Additionally, the layers 402, 404 can comprise a structure similar to the layers 110, 120 described previously with reference to FIGS. 1A, 1B, 2, and 14. Thus, the layers 402, 404 have apertures 130 formed therein. The outer layer 402 is offset from the inner layer 404 such that the apertures 130 of the outer and inner layers 402, 404 do not overlap. As illustrated, the layers 402, 404 of the system 400 illustrated are attached to the wheel 140 at a more central location then the devices 100 and 300 discussed previously. In other words, the layers 402, 404 are not attached to the outer portion of the wheel 140. Rather, the layers 402, 404 are attached closer to the center cross-section of the wheel 140. The configuration illustrated in FIGS. 4A and 4B can make it easier to install the layers 402, 404 to the wheel 140 without covering an air inlet valve (not shown) in the wheel 140.

Figure 5:
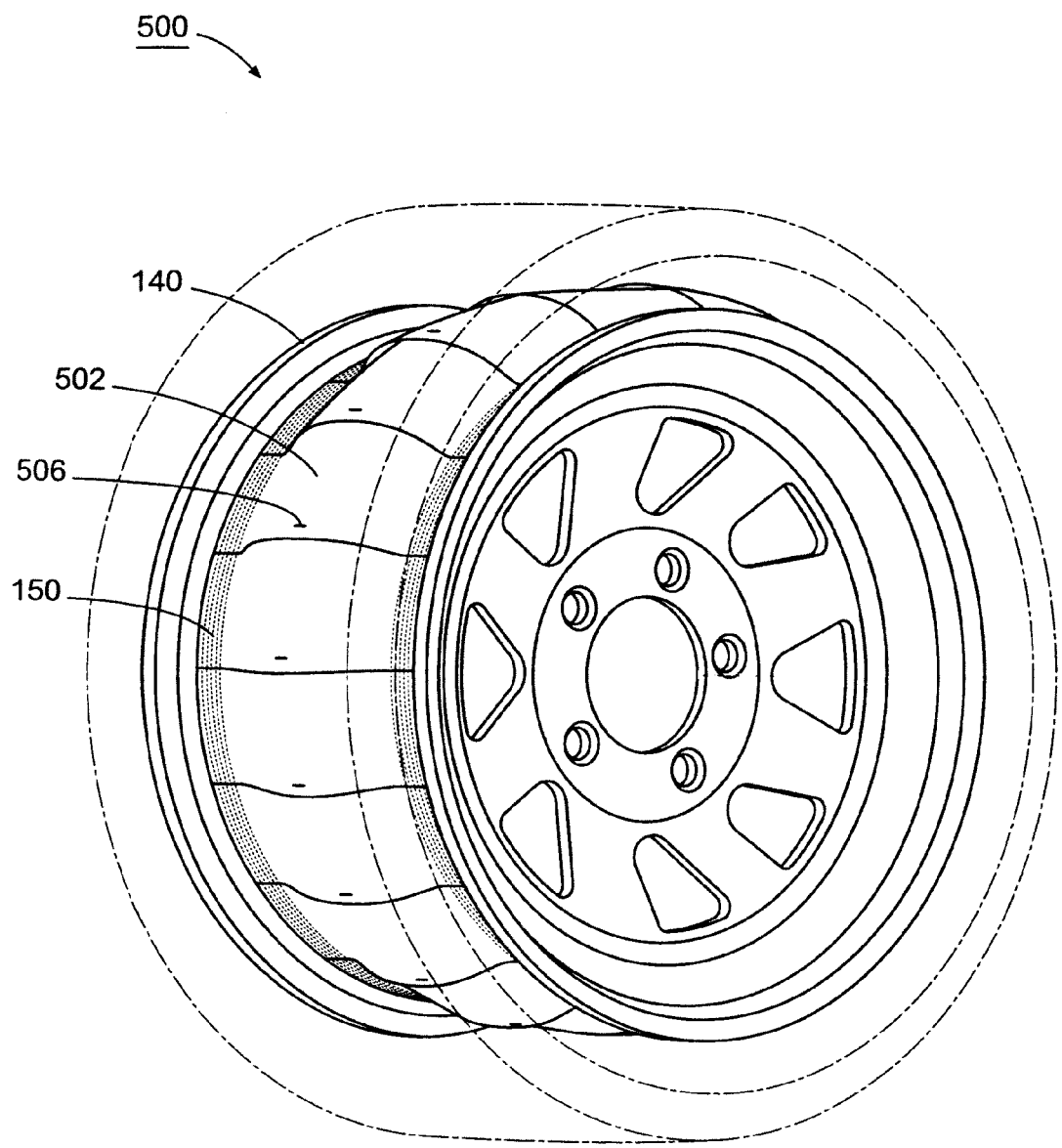
FIG. 5 is a perspective view illustrating a tire noise absorbing system comprising multiple elements that create a flow-resistant barrier according to an exemplary embodiment.

FIG. 5 is a perspective view illustrating a tire noise absorbing system 500 comprising multiple elements 502 that create a flow-resistant barrier according to an exemplary embodiment. The illustrated system 500 comprises multiple, individual elements 502 with ends of adjacent elements 502 overlapping. As shown, the ends of adjacent elements 502 can alternately overlap. In other words, each element 502 can have one end that is overlapped by an adjacent element 502 and another end that overlaps another adjacent element 502.

Each element 502 can comprise materials similar to the materials of the layers 110, 120 described previously with reference to FIGS. 1A, 1B, 2, and 14 and can be similarly coupled to wheel 140 or tire 160. Accordingly, those materials can have similar flow-resistant properties to create a flow-resistant barrier and a frictional noise attenuator.

In an exemplary embodiment, the elements 502 can be coupled one at a time to the wheel 140. Alternatively, the elements 502 can be coupled together at the outside edges to create a strip of elements 502 that can be wrapped around and coupled to the wheel. In addition, a portion of each element 502 that is overlapped by an adjacent element 502 can remain unsecured from the wheel 140 at its edges. That configuration can allow greater tolerances in the manufacturing process.

Centrifugal force will force the elements 502 outward to contact each other at the overlapped portions to create the flow-resistant barrier. Additionally, the overlapping portions of the elements 502 can rub together when deflected by sound shock waves, thereby creating friction to convert the sound energy into heat and to attenuate the sound. Accordingly, the illustrated system 500 can provide diaphragm friction and flow resistance to reduce noise within the tire 160 mounted to the wheel 140.

As shown in FIG. 5, the overlapping portions of the elements 502 are secured to each other with a fastener 506 at the midpoint of their overlap. The fastener 506 can maintain the alignment between adjacent elements 502 and can help maintain the integrity of the inner air cavity 170 created by the elements 502. In exemplary embodiments, fastener 506 can comprise thin plastic fastener, thread, glue, staples, a sonic spot weld, or any other suitable material that can adequately hold adjacent elements 502 in place with respect to each other. Alternatively, the elements 502 can be left unsecured or can be secured with more than one fastener 506 at various locations along the overlap. The fastener 506 is suitable for use with other embodiments described herein to maintain the alignment of the flow-resistant barrier.

The elements 502 of the illustrated system 500 also can be mounted with or without covering the air intake valve (not shown) in the wheel 140 and can provide more room to reliably mount the tire 160 to the wheel 140.

Figure 6A:
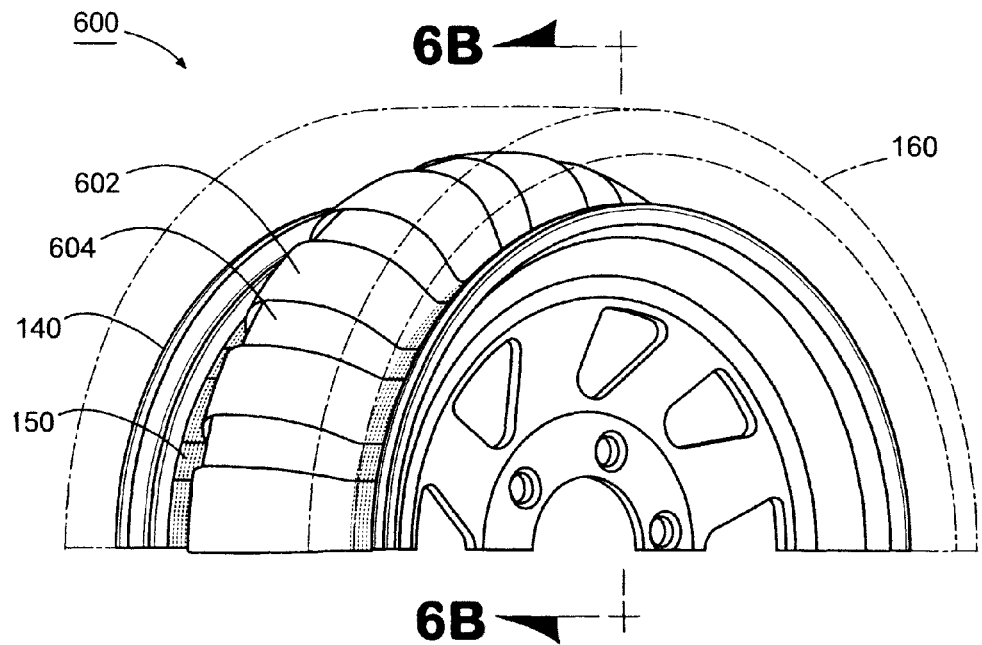
FIG. 6A a perspective view illustrating a portion of a tire noise absorbing system comprising multiple elements that create a flow-resistant barrier according to another exemplary embodiment.
Figure 6B:
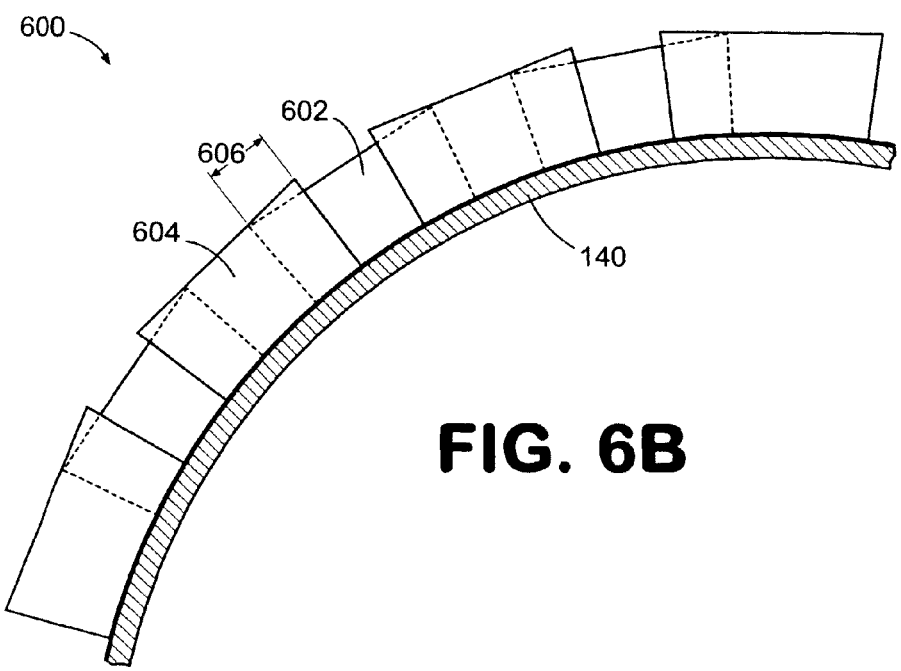
FIG. 6B is a side view of the exemplary system illustrated in FIG. 6A.

FIG. 6A is a perspective view illustrating a tire noise absorbing system 600 comprising multiple elements 602, 604 that create a flow-resistant barrier according to another exemplary embodiment. FIG. 6B is a side view of the exemplary system 600 illustrated in FIG. 6A. As shown in FIGS. 6A and 6B, the system 600 comprises multiple, individual elements 602 that each overlap the ends of two adjacent elements 604 by an amount 606. In other words, each element 602 has one end that overlaps an adjacent element 604 and another end that overlaps another adjacent element 604. Each element 602 represents an outer element with respect to the wheel 140. Each element 604 represents an inner element with respect to the wheel 140.

Each element 602, 604 can comprise materials similar to the materials of the layers 110, 120 described previously with reference to FIGS. 1A, 1B, 2, and 14 and can be similarly coupled to wheel 140 or tire 160. Accordingly, those materials can have similar flow-resistant properties to create a flow-resistant barrier and a frictional noise attenuator.

In an exemplary embodiment, the elements 602, 604 can be coupled one at a time to the wheel 140 at location 150. Alternatively, the elements 602, 604 can be coupled together at their outside edges to create a strip of elements 602, 604 that can be wrapped around and coupled to the wheel 140. In addition, a portion of each element 604 that is overlapped by an adjacent element 602 can remain unsecured from the wheel 140 at its edges. That configuration can allow greater tolerances in the manufacturing process.

Figure 7:
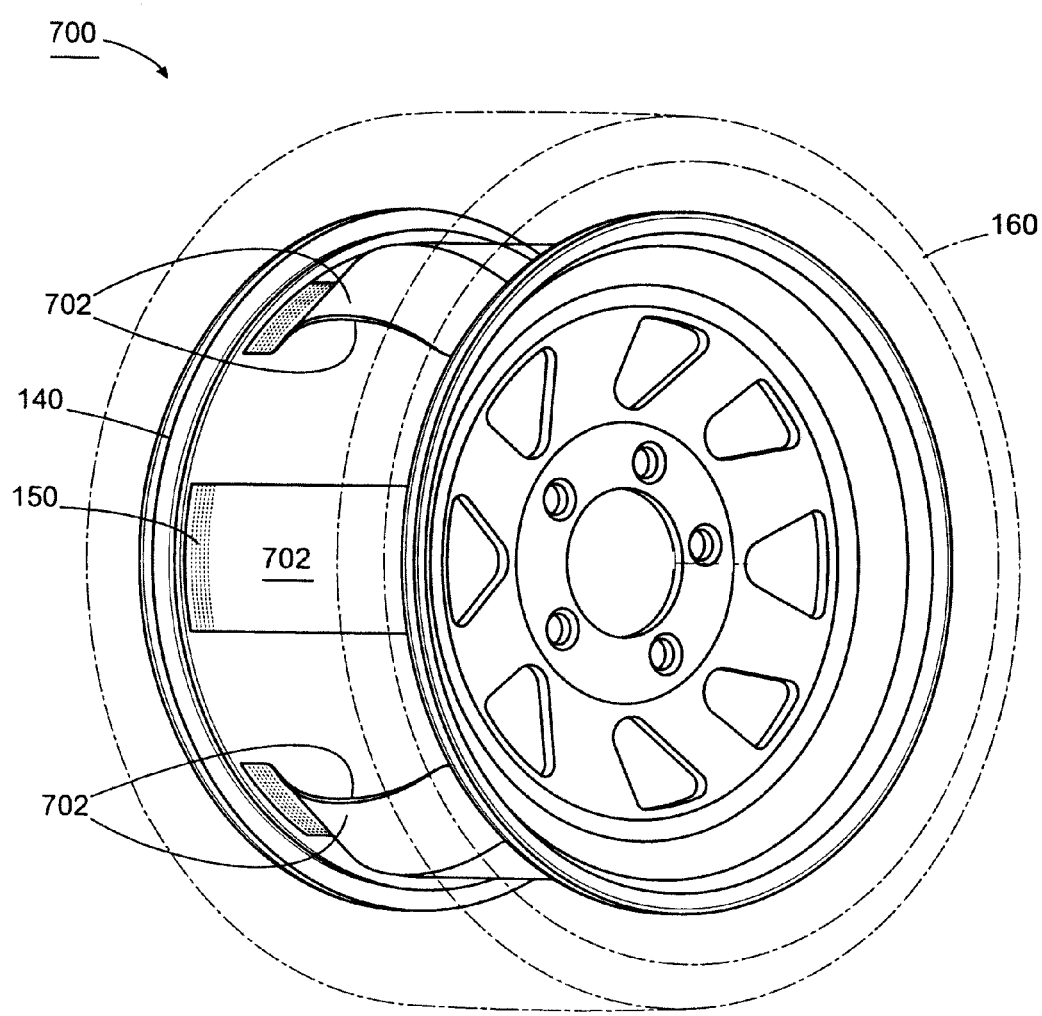
FIG. 7 is a perspective view illustrating a tire noise absorbing system comprising discontinuous elements coupled to a wheel according to an exemplary embodiment.

FIG. 7 is a perspective view illustrating a tire noise absorbing system 700 comprising discontinuous elements 702 coupled to the wheel 140 according to an exemplary embodiment. The system 700 reduces noise via contact friction. Each element 702 comprises two strips of overlapped material, which move in relation to each other when concussed by a shock wave. The centrifugal force provided by the rotating wheel keeps the two strips in contact with each other and the displacement between the strips causes friction. The affect of the friction is to turn the audio shock wave into heat, thereby reducing the noise associated with the shock wave. In alternative exemplary embodiments, additional strips of material can be provided for each element 702. Additional alternative exemplary embodiments can comprise only one element 702 or any number of multiple elements 702 coupled to the wheel 140.

Figure 8A:
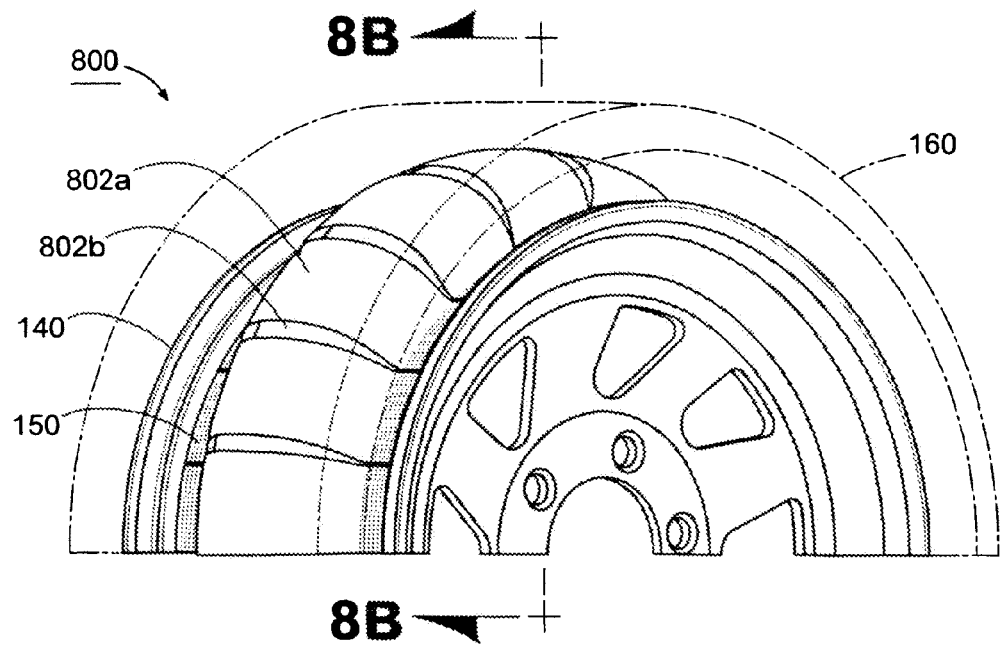
FIG. 8A is a perspective view of a tire noise absorbing system comprising multiple elements that create a flow-resistant barrier according to an exemplary embodiment.
Figure 8B:
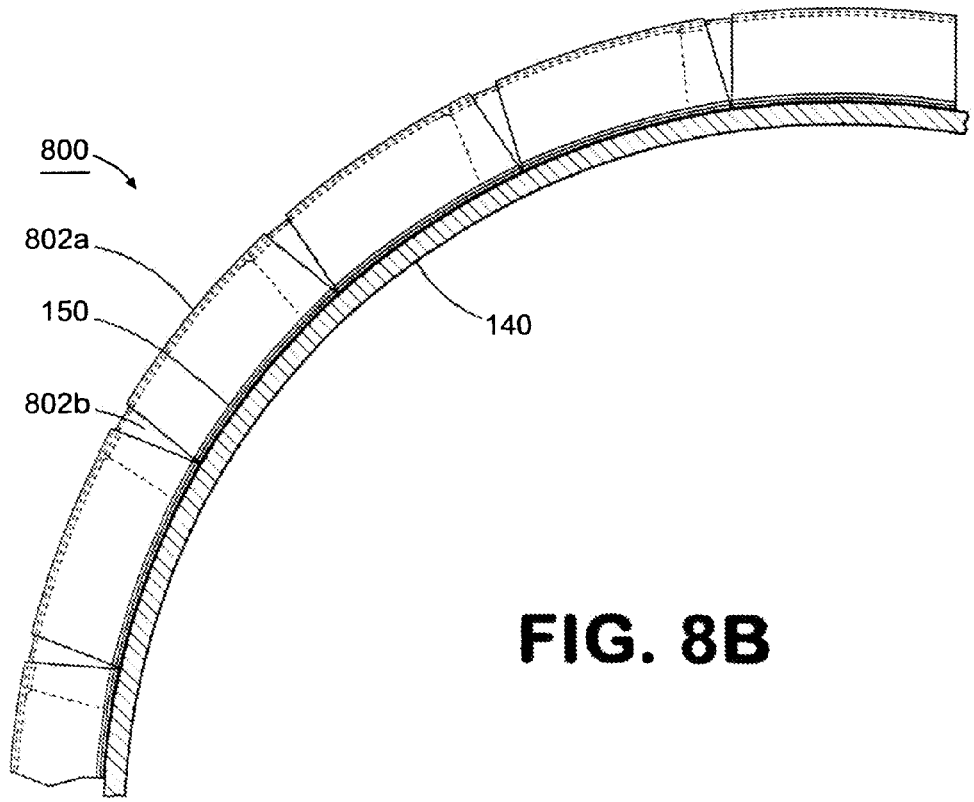
FIG. 8B is a cross-sectional view of the exemplary system illustrated in FIG. 8A.

FIG. 8A is a perspective view of a tire noise absorbing system 800 comprising multiple elements 802 that create a flow-resistant barrier according to an exemplary embodiment. FIG. 8B is a cross-sectional view of the exemplary system 800 illustrated in FIG. 8A. As shown in FIGS. 8A and 8B, the system 800 comprises multiple interlocking elements 802 that each comprises components 802a, 802b.

Component 802a is an outer layer (with respect to the wheel 140) of flow-resistant material attached to the wheel 140 at location 150. Component 802b is an inner layer (with respect to the wheel 140) of flow-resistant material that is attached to the wheel 140 only at its edges beneath component 802a. Thus, a space between the surfaces of components 802a and 802b exists.

Component 802b is longer than component 802a such that it protrudes beyond component 802a a distance of D. The portion of component 802b that extends beyond component 802a is slightly narrower such that its edges do not need to couple directly to the wheel 140. As shown, the illustrated system 800 comprises multiple continuous elements 802 with protruding ends of each component 802b of one element 802 interlocked between surfaces of components 802a and 802b of an adjacent element 802. Centrifugal force will push the components 802a, 802b outward to contact each other to create the flow-resistant barrier. Additionally, the components 802a, 802b will rub together, thereby creating friction to convert sound energy into heat. Accordingly, the illustrated system 800 can provide the diaphragm friction and flow resistance to reduce noise within a tire 160 mounted to the wheel 140.

The system 800 can provide an essentially-sealed, flow-resistant barrier when the tire is rotating, and sufficient air flow for tire inflation when the device is slack. In an exemplary embodiment, the components 802a, 802b of each element 802 can be coupled together with thread, adhesive, or any other suitable material. Multiple adjacent elements 802 can be coupled together at their edges to create a strip of elements 802 that can be wrapped around and coupled to the wheel 140. Alternatively, the elements 802 can be individually coupled to the wheel 140.

The elements 802, either in a strip or individually, can be coupled to the wheel 140 or tire 160 in a variety of ways as otherwise described herein. For example, they can be glued to the wheel, fitted into a groove, or glued to the tire. In addition, adjacent elements 802 can be secured together using fasteners 506 as previously described with reference to FIG. 5.

The elements 802 can comprise materials similar to the materials of the layers 110, 120 described previously with reference to FIGS. 1A, 1B, 2, and 14 and can be similarly coupled to the wheel 140 or tire 160. Accordingly, those materials can have flow-resistant properties to create a flow-resistant barrier and a frictional noise attenuator.

Figure 9A:
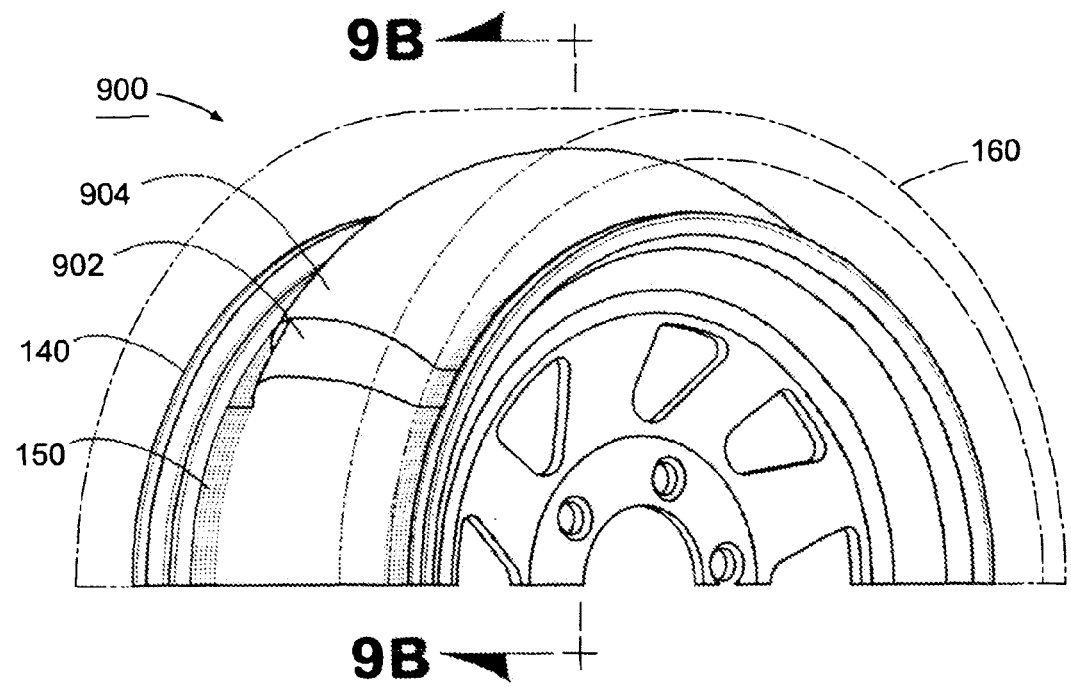
FIG. 9A is a perspective view illustrating a tire noise absorbing system comprising two or more elements that create multiple flow-resistant barriers according to an exemplary embodiment.
Figure 9B:
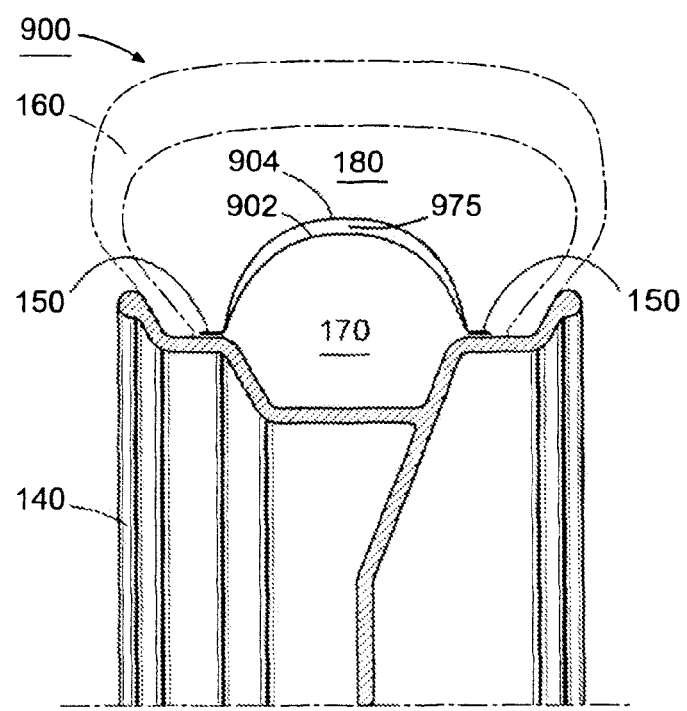
FIG. 9B is a cross-sectional view of the exemplary system illustrated in FIG. 9A.

FIG. 9A is a perspective view illustrating a tire noise absorbing system 900 comprising two or more elements 902, 904 that create multiple flow-resistant barriers according to an exemplary embodiment. FIG. 9B is a cross-sectional view of the exemplary system 900 illustrated in FIG. 9A. As shown in FIGS. 9A and 9B, the elements 902, 904 represent one more of the embodiments illustrated or described herein in one or more of FIGS. 1-8. In addition, elements 902, 904 can represent one or more of the embodiments described hereinafter in one or more of FIGS. 10-12.

In an exemplary embodiment, elements 902, 904 comprise the same structure. Alternatively, elements 902, 904 can comprise different structures. For example, element 902 can comprise two overlapping continuous layers of material with openings therein as illustrated in any of FIGS. 1-4. Element 904 can be the same as element 902. Alternatively, element 904 can comprise any of the structures illustrated in FIG. 5-8 or 10-12, such as alternating overlapping elements as illustrated in FIG. 5.

Regardless of the structure of elements 902, 904, each element can comprise materials similar to the materials of the layers 110, 120 described previously with reference to FIGS. 1A, 1B, 2, and 14 and can be similarly coupled to the wheel 140 or tire 160. Accordingly, those materials can have flow-resistant properties to create a flow-resistant barrier and a frictional noise attenuator for each element 902, 904.

The two elements 902, 904 are coupled to the wheel 140 or tire 160 such that they form three flow-resistant air cavities within the internal tire air chamber. The inner air cavity 170 is formed between the wheel 140 and the inner element 902. The middle air cavity 975 is formed between elements 902 and 904. The outer air cavity 180 is formed between element 904 and the tire. In alternative exemplary embodiments, additional elements can be used to create more air flow-resistant barriers and air cavities within the internal tire air chamber. The creation of multiple flow-resistant barriers restricts air flow through each barrier and therefore absorbs noise associated with sound shock waves passing therethrough. In an exemplary embodiment, the middle air cavity 975 can have a volume that less than the volume of the inner air cavity 170. In another exemplary embodiment, the middle air cavity 975 can have a volume that is about 60-75 percent less than the volume of the inner air cavity 170.

In an exemplary embodiment, the elements 902, 904 can be coupled to each other and then to the wheel 140 or tire 160 at location 150. Alternatively, each element can be coupled to the wheel or tire individually at the same or separate locations. A variety of coupling means can be used as discussed herein including adhesives, clamps, insertion into a groove, or other suitable method.

As shown in FIGS. 9A and 9B, the elements 902, 904 create three air cavities 170, 180, 975 within the internal tire air chamber. Additional elements can be used to create additional air cavities, if desired. Additionally, the air cavities 170, 180, 975 can be formed by coupling elements 902, 904 to the tire 160.

Figure 10:
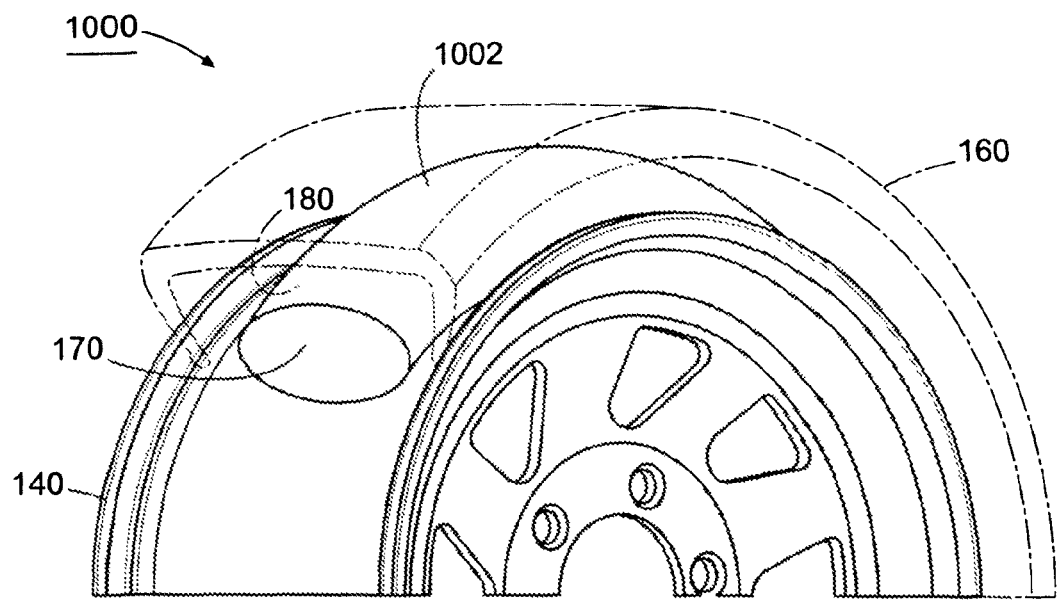
FIG. 10 is a perspective view illustrating a tire noise absorbing system comprising a tubular air flow-resistant barrier according to another exemplary embodiment.

FIG. 10 is a perspective view illustrating a tire noise absorbing system 1000 comprising a tubular air flow-resistant barrier 1002 according to another exemplary embodiment. Barrier 1002 comprises a tubular element of flow-resistant material woven in a curved shape such that it fits in the internal tire air chamber defined by the wheel 140 and tire 160. The centrifugal force provided by the rotating wheel causes the tubular barrier to erect and to fill with air, creating a flow-resistant cavity that will absorb shock waves flowing through the barrier 1002 to reduce tire noise.

The tubular barrier 1002 can be coupled around the wheel in a variety of suitable ways. For example, the tubular barrier 1002 can be tapered and coupled at its ends, thus sealing the air cavity in one location. It can also be weaved together to create a continuous circular air cavity. Such an embodiment can be weaved or coupled in any other suitable way either directly around the wheel or in advance and then fitted over the wheel. The element 1002 then can be coupled to the wheel or tire. Alternatively, it can be left unsecured, staying in position by encompassing the circumference of the wheel 140.

The element 1002 can comprise materials similar to the materials of the layers 110, 120 described previously with reference to FIGS. 1A, 1B, 2, and 14 and can be similarly coupled to wheel 140 or tire 160. Accordingly, those materials can have flow-resistant properties to create a flow-resistant barrier.

Figure 11:
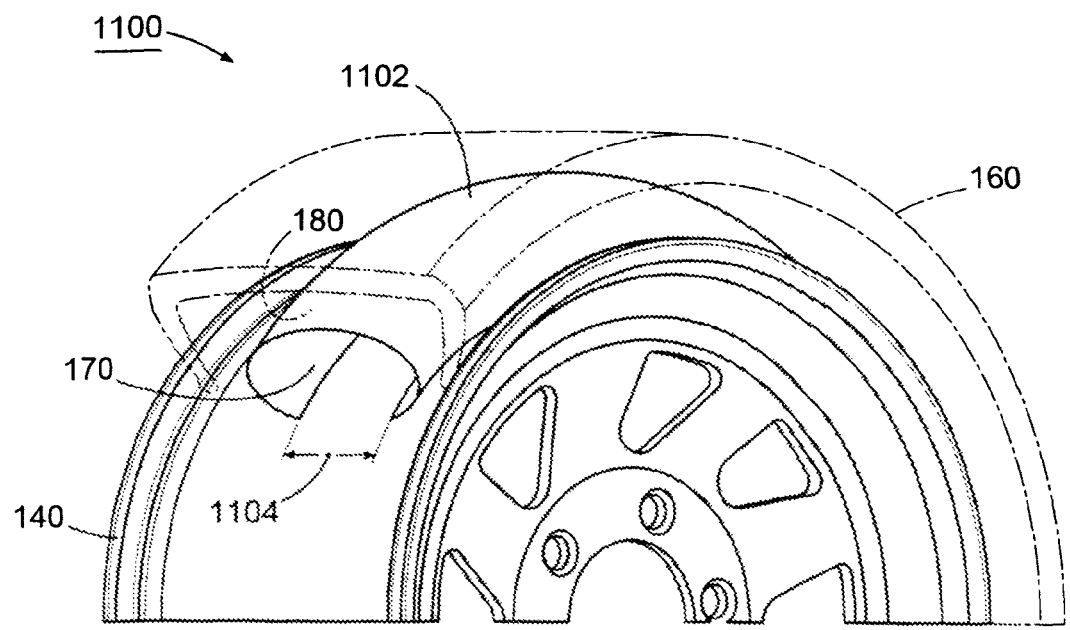
FIG. 11 is a perspective view illustrating a tire noise absorbing system comprising a continuous flow-resistant barrier according to an exemplary embodiment.

FIG. 11 is a perspective view illustrating a tire noise absorbing system 1100 comprising a continuous flow-resistant barrier 1102 according to an exemplary embodiment. Barrier 1102 comprises a crescent-shaped element woven in a curved shape such that it fits around the wheel 140. Alternatively, the curvature of barrier 1102 can be semi-circular or any other suitable curvature. For example, barrier 1102 can be curved such that it makes up 180 to 270 degrees of a circle, with its ends separated by distance 1104. Barrier 1102 can be coupled to the tire or wheel by any suitable means described herein. Centrifugal force provided by rotating wheel 140 causes the barrier 1102 to erect and to fill with air, creating a flow-resistant barrier that will absorb shock waves flowing through the element 1002 to reduce tire noise.

Barrier 1102 can comprise materials similar to the materials of the layers 110, 120 described previously with reference to FIGS. 1A, 1B, 2, and 14, but without apertures 130, and can be similarly coupled to wheel 140 or tire 160. Accordingly, those materials can have flow-resistant properties to create a flow-resistant barrier. At the same time, the material can still provide enough air flow to allow for complete tire inflation.

FIG. 12 is a perspective view illustrating a tire noise absorbing system 1200 comprising multiple tubular air flow-resistant barriers 1202 according to an exemplary embodiment. Barriers 1202 are tubular elements weaved in a curved shape and then coupled to the wheel 140 or tire 160, creating multiple flow-resistant air cavities each similar to those previously discussed with reference to FIG. 10. Alternatively, multiple elements 1202 can be coupled together at their ends 1204 to form a circle that will fit in the internal tire air chamber defined by the wheel 140 and the tire 160. The centrifugal force provided by the rotating wheel will cause the barriers 1202 to erect and to inflate with air, creating separate flow-resistant cavities around the wheel 140.

FIG. 13 is a perspective view illustrating a representative element 1300 that can be used in any embodiment illustrated in FIGS. 1-12 and 14 according to an exemplary embodiment. Thus, FIG. 13 illustrates an element 1300 whose characteristics can be used in the elements of any of the previously described embodiments to create a flow-resistant barrier. Element 1300 comprises a dampener 1302 arranged in a pattern lengthwise along element 1300. Dampener 1302 can reduce the natural resonance vibration of the material, thus causing element 1300 to remain stiffer under high torque situations to maintain proper shape and to prevent breakage. The dampening can increase the absorbing performance because the absorber will have reduced performance if it is just vibrating in resonance with an existing sound source. Dampener 1302 can comprise a pliable material such as silicone rubber, a permeable oil, thread, epoxy, an additional cloth element, or other suitable material. The pliable material can add local stiffening to the element 1300 to create different resonant characteristics for a particular type of cloth, thereby targeting a desired spectrum of low-frequency energy. For example, Dampener 1302 can be added to a single location, or, alternatively, it can be arranged in a pattern along element 1300, either cross-wise, length-wise, or in another suitable formation.

The element 1300 also comprises an attachment 1304. Attachment 1304 comprises a material attached to the edges of element 1300 to produce a composite edge that provides ease and efficiency in attaching the element 1300 to either the wheel 140 or tire 160. This coupling option provides a possible alternative to the previously mentioned coupling options. Attachment 1304 comprises a material that will couple more easily to the wheel 140 or tire 160 than the material of element 1300 will couple to those items. In alternative exemplary embodiments, attachment 1304 can comprise plastic, cotton, fabric, metal, or any other suitable material for coupling the element 1302 to the wheel 140 or the tire 160.

Attachment 1304 can be attached to the material of element 1300 with adhesive, thread, or other suitable means. As illustrated in FIG. 13, attachment 1304 comprises a strip of suitable material coupled to element 1300 along the length of the edges of element 1300. Alternatively, attachment 1304 can comprise smaller, distinct pieces that are attached repeatedly along the edges of element 1300.

The element 1300 can comprise materials similar to the materials of the layers 110, 120 described previously with reference to FIGS. 1A, 1B, 2, and 14 and can be similarly coupled to wheel 140 or tire 160. Accordingly, those materials can have flow-resistant properties to create a flow-resistant barrier and a frictional noise attenuator.

As discussed herein, a tire noise reducing device can comprise continuous air flow-resistant layers of overlapped material with openings therein; a single flow-resistant and continuous layer without openings; multiple individual elements with overlapping and/or interlocking end portions; multiple discontinuous elements; two or more layers of elements that create multiple flow-resistant barriers; a single tubular element; a semicircular element; or multiple tubular elements.

In exemplary embodiments, small production runs for the material of the flow-resistant barriers described herein can comprise laser cutting the layers or individual elements to the specific wheel and tire dimensions. Large production runs can be die cut.

According to an exemplary embodiment, the tire noise absorbing systems described herein can absorb sound in the full audio band of about 15 Hz to about 20 kHz. Since some tire structures do not include noise in frequencies significantly above 800 Hz, the tire noise absorbing systems described herein also can absorb sound in a range of about 15 Hz to about 800 Hz. Additionally, varying the material of the flow-resistant barrier and the size of the cavity defined by the barrier can adjust the sound frequency absorbing characteristics of the systems to a desired range.

The tire noise absorbing systems according to the exemplary embodiments described herein can provide several benefits. For example, reducing internal tire energy can reduce tire structure hysteresis. This affect can increase tread adhesion by reducing the energy that causes tread contact bounce. Further, reducing hysteresis can reduce the tire temperature, which can allow a tire manufacturer to use tire compounds with greater adhesion but lower maximum temperature. Reducing tire temperature also can extend the life of tires under racing conditions. For commercial applications, the reduction of temperature and the increase of adhesion can result in lower rolling resistance and greater tire life. This affect would result in significantly lower operating costs for applications such as heavy trucks and public transit. Each of these improvements can result in tire and automobile performance improvements.

The device increases tire life by absorbing energy inside the tire, thereby reducing contact bounce. This reduction increases adhesion of the tire to the road surface, which can reduce the scrubbing movement between the tire and road surface. Since scrubbing off rubber by adhesion slip is a large cause of tire wear, the tire noise absorbing systems can increase the dynamic performance and adhesion of a tire.

In an alternative exemplary embodiment (not shown), one or more micro-perforated metal layers can be used instead of cloth layers. The metal layers can be formed to have the desired shape around the circumference of the wheel 140, can be coupled to the wheel 140 or to a tire 160 mounted on the wheel 140, and can create an inner and outer air cavity 170, 180 between the tire 160 and the wheel 140. The perforations in the layers can restrict air flow between the outer and inner cavities 170, 180, thereby absorbing low-frequency energy of shock waves transmitted between the outer and inner cavities 170, 180 and vice versa. Additionally, if multiple layers are used, the shock waves can cause the multiple layers to move relative to each other, thereby absorbing additional energy by converting friction energy into heat. According to an exemplary embodiment, the perforations on the metal layers can produce a porosity in the range of about 10% to about 50% cavity fill at cavity saturation.

Although specific embodiments have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

The invention claimed is:

1. A system for dissipating sound shock waves, comprising:
    a tire that can be mounted to a wheel to create an internal air chamber defined by the wheel and said tire; and
    a flow-resistant barrier disposed within the internal air chamber, said barrier defining a boundary of an air cavity that is within the internal air chamber and that is between said barrier and the wheel, said barrier comprising a material that provides an acoustical resistance to sound shock waves passing therethrough, wherein said barrier comprises a plurality of elements disposed continuously within the internal air chamber such that every other one of said elements is overlapped on one of its ends by an adjacent one of said elements and is overlapped on another one of its ends by another adjacent one of said elements, and
    wherein the air cavity defined by said barrier has a volume such that air within the cavity allows the passage of shock waves through said barrier and into the air cavity.

2. The system according to claim 1, wherein centrifugal force erects said barrier around the wheel to create the air cavity.

3. The system according to claim 1, wherein said barrier produces frictional heat when displaced by a shock wave passing therethrough, thereby converting energy of the shock wave to heat to reduce noise associated therewith.

4. The system according to claim 1, wherein said barrier is disposed within the internal air chamber by being coupled to said tire.

5. The system according to claim 1, wherein said barrier comprises a dampening element that changes a resonant frequency of the system.

6. The system according to claim 1, further comprising the wheel to which the tire is mounted.

7. The system according to claim 6, wherein said barrier is disposed within the internal air chamber by being coupled to said wheel.

8. A system for dissipating sound shock waves, comprising:
    a tire that can be mounted to a wheel to create an internal air chamber defined by the wheel and said tire; and
    a flow-resistant barrier disposed within the internal air chamber, said barrier defining a boundary of an air cavity that is within the internal air chamber and that is between said barrier and the wheel, said barrier comprising a material that provides an acoustical resistance sound shock waves passing therethrough,
    wherein said barrier comprises a plurality of interlocking elements disposed continuously within the internal air chamber,
    wherein each of said interlocking elements comprises two components of flow-resistant material with a first component being longer than a second component, wherein said interlocking elements are disposed continuously within the internal air chamber such that the longer component of each one of said elements is disposed between the longer and shorter components of an adjacent one of said elements, and
    wherein the air cavity defined by said barrier has a volume such that air within the cavity allows the passage of shock waves through said barrier and into the air cavity.

9. The system according to claim 8, wherein centrifugal force erects said barrier around the wheel to create the air cavity.

10. The system according to claim 8, wherein said barrier produces frictional heat when displaced by a shock wave passing therethrough, thereby converting energy of the shock wave to heat to reduce noise associated therewith.

11. The system according to claim 8, wherein said barrier is disposed within the internal air chamber by being coupled to said tire.

12. The system according to claim 8, further comprising the wheel to which the tire is mounted, wherein said barrier is disposed within the internal air chamber by being coupled to said wheel.

13. The system according to claim 8, wherein said barrier comprises a dampening element that changes a resonant frequency of the system.

14. A device for dissipating sound shock waves, comprising:
    a flow-resistant barrier that defines a boundary of an air cavity that is within an internal air chamber created by a tire mounted to a wheel and that is between said barrier and the wheel, said barrier comprising a material that provides an acoustical resistance to sound shock waves passing therethrough, wherein said barrier comprises a plurality of elements disposed continuously within the internal air chamber such that every other one of said elements is overlapped on one of its ends by an adjacent one of said elements and is overlapped on another one of its ends by another adjacent one of said elements, and
    the air cavity defined by said barrier having a volume such that air within the cavity allows the passage of shock waves through said barrier and into the air cavity.

15. The system according to claim 14, further comprising the wheel, wherein said barrier is attached to said wheel.

16. The system according to claim 14, further comprising the tire, wherein said barrier is attached to said tire.

17. The system according to claim 14, further comprising the wheel and the tire, wherein said barrier is attached to one of said wheel and said tire.

18. The system according to claim 14, wherein centrifugal force erects said barrier around the wheel to create the air cavity.

19. The system according to claim 14, wherein said barrier produces frictional heat when displaced by a shock wave passing therethrough, thereby converting energy of the shock wave to heat to reduce noise associated therewith.

20. The system according to claim 14, wherein said barrier comprises a dampening element that changes a resonant frequency of the system.

* * * * *